United States Patent
Idicheria et al.

(10) Patent No.: US 9,599,061 B2
(45) Date of Patent: Mar. 21, 2017

(54) INTERNAL COMBUSTION ENGINE AND METHOD OF IGNITING A FUEL

(71) Applicant: GM GLOBAL TECHNOLOGY OPERATIONS LLC, Detroit, MI (US)

(72) Inventors: Cherian A. Idicheria, Novi, MI (US); Orgun A. Guralp, Ann Arbor, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 297 days.

(21) Appl. No.: 14/317,019

(22) Filed: Jun. 27, 2014

(65) Prior Publication Data

US 2015/0377206 A1    Dec. 31, 2015

(51) Int. Cl.
*F02P 15/00* (2006.01)
*F02D 41/40* (2006.01)
(Continued)

(52) U.S. Cl.
CPC .......... *F02D 41/402* (2013.01); *F02B 17/005* (2013.01); *F02B 23/08* (2013.01);
(Continued)

(58) Field of Classification Search
CPC .................. F02D 41/402; F02B 17/005; F02B 2023/085; F02P 15/02
See application file for complete search history.

(56) References Cited

U.S. PATENT DOCUMENTS 6,286,482 B1     9/2001  Flynn et al.
2006/0124104 A1*  6/2006  Altenschmidt ..... F02D 41/3029
                                              123/299

(Continued)

FOREIGN PATENT DOCUMENTS

CN    101855444 A    10/2010
JP    2010037950 A    2/2010

OTHER PUBLICATIONS

Gundersen, Oct. 1, 2009, "Energy Efficient Transient Plasma Ignition and Combustion", USC Dept. of Electrical Engineering—Electrophysics, (https://web.archive.org/web/20091001191230/http://ronney.usc.edu/research/coronaignition/).*

(Continued)

*Primary Examiner* — Lindsay Low
*Assistant Examiner* — Kevin Lathers
(74) *Attorney, Agent, or Firm* — Quinn Law Group, PLLC

(57) ABSTRACT

A method of igniting a fuel within a combustion chamber defined by a cylinder block of an internal combustion engine includes injecting a first portion of a fuel into the combustion chamber, and energizing a first plasma igniter. The first plasma igniter is configured for generating a first plurality of free radicals, extends through a cylinder head mated to the cylinder block, and protrudes into an intake port defined by the cylinder head that is disposable in fluid communication with the combustion chamber. After injecting the first portion, the method includes activating a second igniter configured for initiating a flame within the combustion chamber to thereby ignite the fuel. The second igniter extends through the cylinder head and protrudes into the combustion chamber. An internal combustion engine is also disclosed.

19 Claims, 4 Drawing Sheets

(51) Int. Cl.

| | |
|---|---|
| *F02B 17/00* | (2006.01) |
| *F02B 23/08* | (2006.01) |
| *F02B 23/10* | (2006.01) |
| *F02P 5/04* | (2006.01) |
| *F02D 37/02* | (2006.01) |
| *F02F 1/24* | (2006.01) |
| *F02P 15/02* | (2006.01) |
| *F02P 23/04* | (2006.01) |
| *F02D 41/38* | (2006.01) |

(52) U.S. Cl.
CPC ............ *F02B 23/105* (2013.01); *F02D 37/02* (2013.01); *F02P 5/045* (2013.01); *F02P 15/00* (2013.01); *F02D 2041/389* (2013.01); *F02F 1/242* (2013.01); *F02P 15/02* (2013.01); *F02P 23/04* (2013.01); *Y02T 10/44* (2013.01)

(56) References Cited

U.S. PATENT DOCUMENTS

2009/0151322 A1\* 6/2009 Coates ................. F01N 3/0275 60/275
2010/0175655 A1 7/2010 Lykowski et al.

OTHER PUBLICATIONS

Mohammadi, Kawanabe, Ishiyama, Shioji, Komada; "Study on Combustion Control in Natural-Gas PCCI Engines with Ozone Addition into Intake Gas"; SAE Technical Paper Series; Apr. 3-6, 2006; 2006-1-0419; SAE Warrendale, PA.

Suess, Guenthner, Schenk, Rottengruber; "Investigation of the potential of corona ignition to control gasoline homogeneous charge compression ignition combustion"; Journal of Automobile Engineering 2012 226: 275; published online Sep. 13, 2011; Publish by SAGE on behalf of Institution of Mechanical Engineers.

Burrows, Lykowski, Mixell; "Corona Ignition System for Highly Efficient Gasoline Engines"; MTZ 0612013; vol. 74; pp. 38-41; http://www.federalmogul.com/en-US/Media/Documents/CoronaIgnitionSystem_MTZ_62013.pdf, accessed on Apr. 9, 2014.

Shiraishi; "Possibility of the new Ignition System using the low Temperature Plasma having dual Functions of strengthening Ignition for SI Combustion and promoting and controlling Autoignition of HCCI Combustion"; 1st International Conference: Advanced Ignition Systems for Gasoline Engines; Nov. 12-13, 2012; Berlin.

Berndt, Rottenkolber, Herweg, Haase, Dieler; "Lean burn combustion for gasoline engines: potential of high frequency ignition and high pressure injection"; 1st International Conference: Advanced Ignition Systems for Gasoline Engines; Nov. 12-13, 2012; Berlin.

\* cited by examiner

INTERNAL COMBUSTION ENGINE AND METHOD OF IGNITING A FUEL

TECHNICAL FIELD

The disclosure relates to an internal combustion engine and to a method of igniting a fuel.

BACKGROUND

Vehicles may be powered by an internal combustion engine. During operation of the internal combustion engine, a heat source may ignite a fuel within a combustion chamber to combust the fuel and provide power to the vehicle. Such ignition may occur hundreds of times per second during specific operating modes of the internal combustion engine.

SUMMARY

A method of igniting a fuel within a combustion chamber defined by a cylinder block of an internal combustion engine includes injecting a first portion of the fuel into the combustion chamber, and energizing a first plasma igniter. The first plasma igniter extends through a cylinder head mated to the cylinder block and protrudes into an intake port defined by the cylinder head that is disposable in fluid communication with the combustion chamber. After injecting the first portion, the method includes activating a second igniter configured for initiating a flame within the combustion chamber to thereby ignite the fuel, wherein the second igniter extends through the cylinder head and protrudes into the combustion chamber.

An internal combustion engine includes a cylinder block defining a combustion chamber therein, and a cylinder head mated to the cylinder block. The cylinder head covers the combustion chamber and defines an intake port disposable in fluid communication with the combustion chamber. The internal combustion engine also includes a fuel nozzle configured for injecting a fuel into the combustion chamber. The internal combustion engine further includes a first plasma igniter configured for generating a first plurality of free radicals within the intake port. The first plasma igniter extends through the cylinder head and protrudes into the intake port. The internal combustion engine also includes a second igniter configured for initiating a flame within the combustion chamber to thereby ignite the fuel. The second igniter extends through the cylinder head and protrudes into the combustion chamber.

As used herein, the terms "a," "an," "the," "at least one," and "one or more" are interchangeable and indicate that at least one of an item is present. A plurality of such items may be present unless the context clearly indicates otherwise. All numerical values of parameters, quantities, or conditions in this disclosure, including the appended claims, are to be understood as being modified in all instances by the term "about" or "approximately" whether or not "about" or "approximately" actually appears before the numerical value. "About" and "approximately" indicate that the stated numerical value allows some slight imprecision (e.g., with some approach to exactness in the value; reasonably close to the value; nearly; essentially). If the imprecision provided by "about" or "approximately" is not otherwise understood with this meaning, then "about" and "approximately" as used herein indicate at least variations that may arise from methods of measuring and using such parameters. Further, the terminology "substantially" also refers to a slight imprecision of a condition (e.g., with some approach to exactness of the condition; approximately or reasonably close to the condition; nearly; essentially). In addition, disclosed numerical ranges include disclosure of all values and further divided ranges within the entire range. Each value within a range and the endpoints of a range are all disclosed as separate embodiments. The terms "comprising," "comprises," "includes," "including," "has," and "having" are inclusive and therefore specify the presence of stated items, but do not preclude the presence of other items. As used in this disclosure, the term "or" includes any and all combinations of one or more of the listed items.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
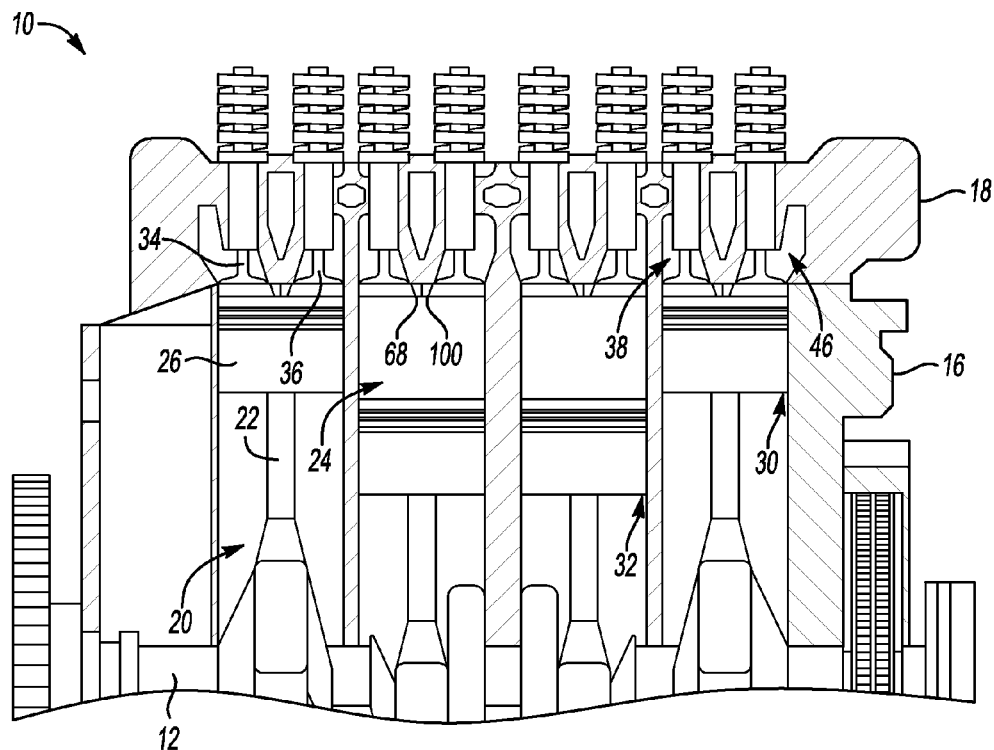
FIG. 1 is a schematic illustration of a cross-sectional fragmentary view of an internal combustion engine, wherein the internal combustion engine defines a plurality of combustion chambers, a plurality of intake ports, and a plurality of exhaust ports.

Referring to the Figures, wherein like reference numerals refer to like elements, an internal combustion engine 10 for a vehicle is shown generally in FIG. 1. The internal combustion engine 10 may be useful for automotive applications, such as passenger sedans, sport utility vehicles, or trucks. However, the internal combustion engine 10 may also be useful for non-automotive applications, such as for industrial vehicles, recreational vehicles, or power generation.

As described with reference to FIG. 1, the internal combustion engine 10 may be operably connected to a plurality of wheels (not shown) disposed on one or more axles (not shown) of the vehicle to provide power for translating the vehicle along a surface. For example, the internal combustion engine 10 may be connected to a crankshaft 12 and transmission (not shown) which may in turn rotate the one or more axles. The internal combustion engine 10 may provide direct motive power to the plurality of wheels, such as via the crankshaft 12 connected to the one or more axles, or may provide power to one or more electric motors (not shown) and/or batteries (not shown), which may in turn provide direct motive power to the plurality of wheels. Regardless, the internal combustion engine 10 may be configured for providing power to the vehicle by combusting a fuel 14 (FIGS. 2-4) and converting chemical energy to mechanical energy.

With continued reference to FIG. 1, the internal combustion engine 10 includes a cylinder block 16 and a cylinder head 18 mated to the cylinder block 16. For example, the internal combustion engine 10 may include a head gasket (not shown) configured to sealingly mate the cylinder head 18 to the cylinder block 16. The cylinder block 16 defines a cylinder bore 20 therein that is shaped for housing a piston 22. For example, the cylinder block 16 may define four, six, eight, or twelve cylinder bores 20 therein, and the internal combustion engine 10 may therefore be respectively characterized as a 4-cylinder, 6-cylinder, 8-cylinder, or 12-cylinder internal combustion engine 10. Alternatively, the cylinder block 16 may define one, two, three, or five cylinder bores 20 therein, and the internal combustion engine 10 may therefore be respectively characterized as a 1-cylinder, 2-cylinder, 3-cylinder, or 5-cylinder internal combustion engine 10.

In addition, the cylinder block 16 defines a combustion chamber 24 therein disposed between the piston 22 and the cylinder head 18. More specifically, the cylinder head 18 is mated to the cylinder block 16 such that the cylinder head 18 covers the combustion chamber 24.

Generally, as shown in FIG. 1, the internal combustion engine 10 may include the same number of pistons 22 as cylinder bores 20 so that one piston 22 is disposed within each cylinder bore 20 and is attached to the crankshaft 12. Each piston 22 may include a piston head 26 that is sized to slideably translate within the cylinder bore 20. Therefore, the piston head 26 may alternately translate towards and away from the cylinder head 18 to thereby rotate the crankshaft 12 through a plurality of rotational positions 28 (FIGS. 7-9), measured in angular degrees of rotation, so that the internal combustion engine 10 may convert linear motion of the piston 22 into rotational motion.

Referring again to FIG. 1, each of the plurality of pistons 22 is configured for reciprocating within a respective one of the cylinder bores 20 between a first position (shown generally at 30) and a second position (shown generally at 32) to thereby collectively intake and displace a quantity of air from the internal combustion engine 10. For example, the first position 30 may be characterized as "top dead center" and may refer to a position at which the piston head 26 is disposed farthest away from the crankshaft 12 and the crankshaft 12 has a rotational position 28 (FIGS. 7-9) of 0°. Similarly, the second position 32 may be characterized as "bottom dead center" and may refer to a position at which the piston head 26 is disposed closest to the crankshaft 12 and the crankshaft 12 has a rotational position 28 of 180°. Therefore, as the plurality of pistons 22 reciprocate within the plurality of cylinder bores 20 between the first position 30 and the second position 32, the internal combustion engine 10 may "breathe" to intake and displace the quantity of air.

Figure 2:
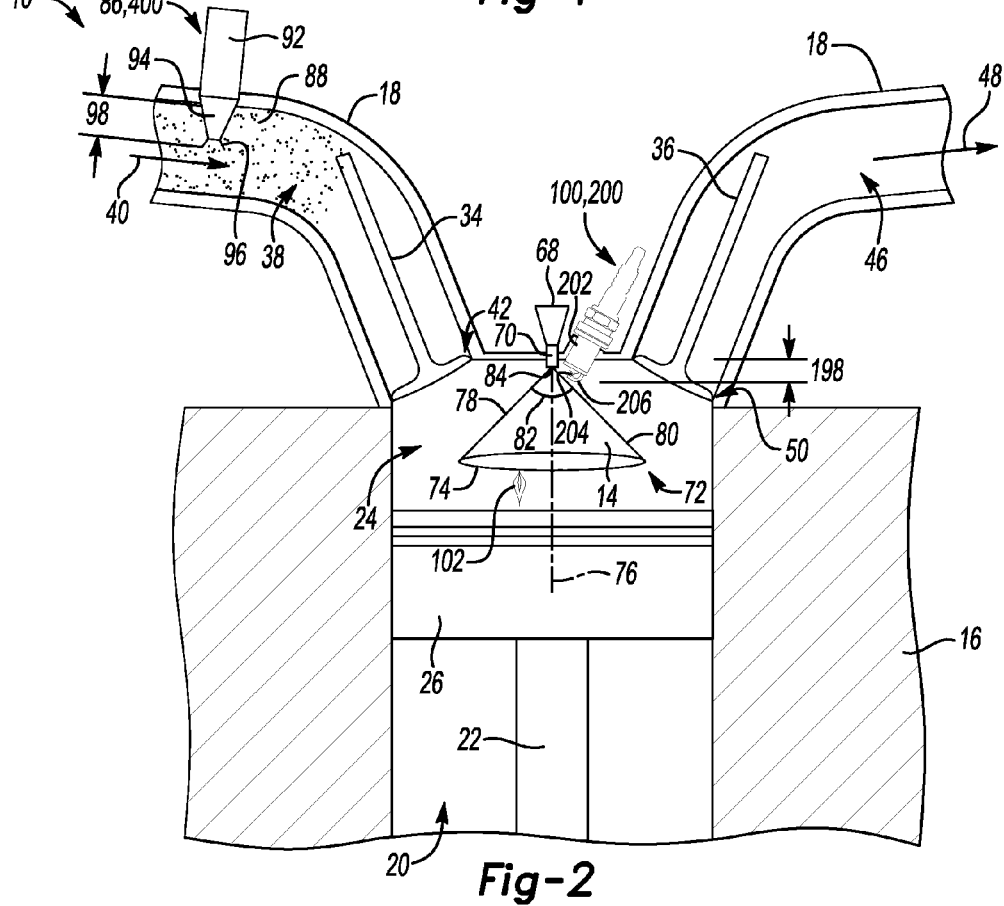
FIG. 2 is a schematic illustration of a cross-sectional view of one of the plurality of combustion chambers, a respective one of the plurality of intake ports, and a respective one of the plurality of exhaust ports of FIG. 1, wherein a first plasma igniter protrudes into the intake port.
Figure 3:
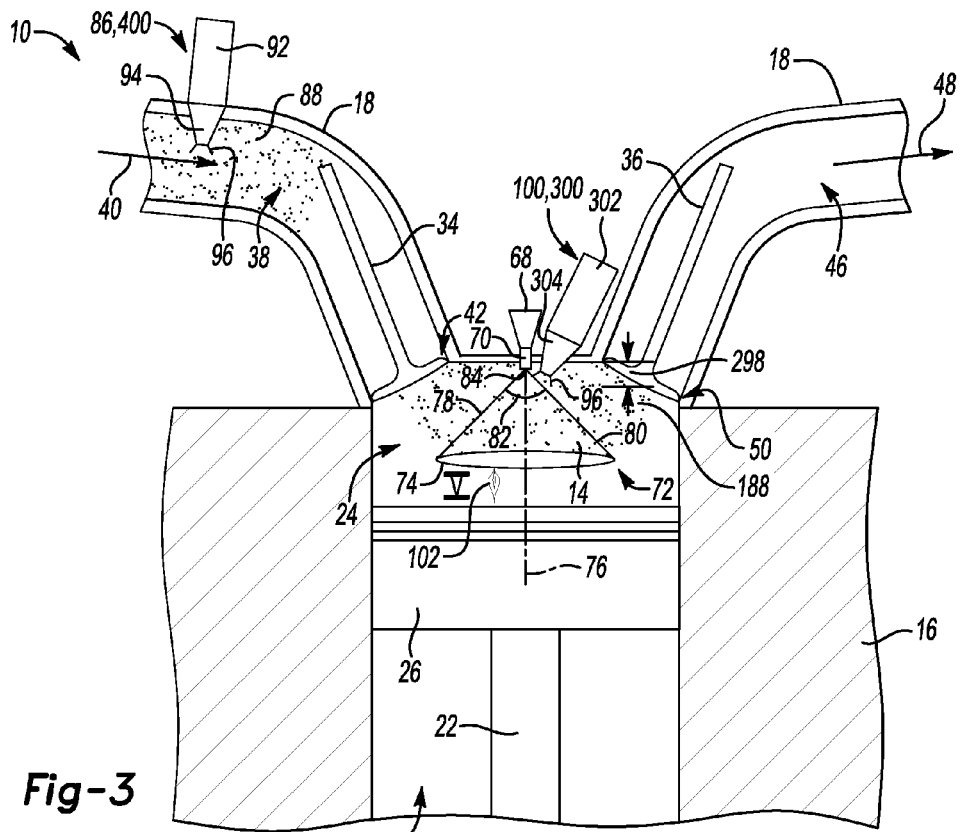
FIG. 3 is a schematic illustration of a cross-sectional view of another embodiment of the combustion chamber of FIG. 2, wherein a second igniter protrudes into the combustion chamber.
Figure 4:
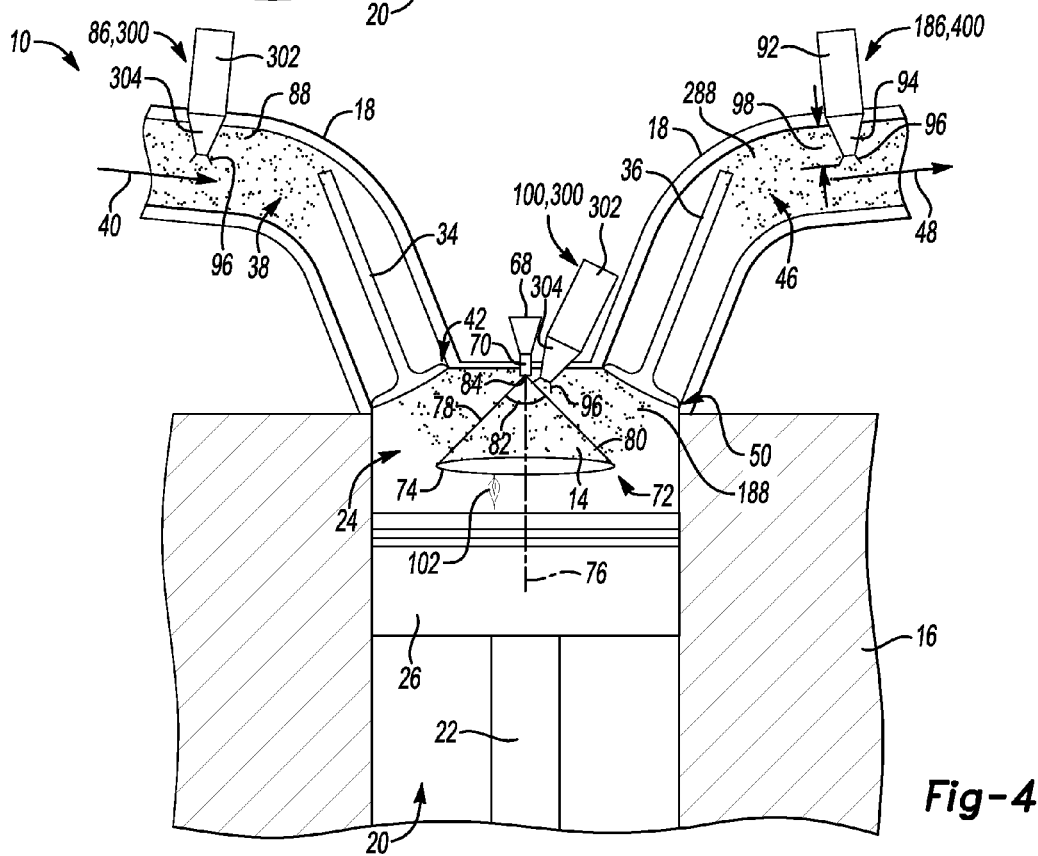
FIG. 4 is a schematic illustration of a cross-sectional view of a further embodiment of the combustion chamber of FIG. 2, wherein a third plasma igniter protrudes into the exhaust port.

Referring now to FIGS. 2-4, to optimize combustion of the fuel 14 within the combustion chamber 24, the internal combustion engine 10 may also include an intake valve 34 and an exhaust valve 36. That is, the cylinder head 18 defines an intake port or runner 38 therein that is disposable in fluid communication with the combustion chamber 24, and the intake valve 34 may be disposed within the intake port 38. The intake port or runner 38 may be arranged to feed intake air (represented generally by arrow 40) into the combustion chamber 24 during operation of the internal combustion engine 10.

As such, the intake valve 34 may be configured for alternatingly allowing and preventing fluid communication between the intake port 38 and the combustion chamber 24. For example, during operation of the internal combustion engine 10, the intake valve 34 may transition from a seated position 42 (FIGS. 2-4) in which the intake port 38 and the combustion chamber 24 are not disposed in fluid communication, to an unseated position 44 (FIGS. 7-9) in which the intake port 38 and the combustion chamber 24 are disposed in fluid communication to thereby allow intake air 40 into the combustion chamber 24. Conversely, the intake valve 34 may transition from the unseated position 44 to the seated position 42 to thereby prevent intake air 40 from entering the combustion chamber 24. In one non-limiting embodiment, the internal combustion engine 10 includes two intake valves 34 per each combustion chamber 24. In other non-limiting embodiments, the internal combustion engine 10 may include one intake valve 34 or three intake valves 34 per combustion chamber 24.

Similarly, referring again to FIGS. 2-4, the cylinder head 18 may define an exhaust port or runner 46 therein disposable in fluid communication with the combustion chamber 24, and the exhaust valve 36 may be disposed within the exhaust port 46. The exhaust port or runner 46 may be arranged to transmit exhaust gas (represented generally by arrow 48) from the combustion chamber 24 during operation of the internal combustion engine 10. The exhaust port or runner 46 may also enable exhaust gas 48 re-breathing or re-induction.

As such, the exhaust valve 36 may be configured for alternatingly allowing and preventing fluid communication between the exhaust port 46 and the combustion chamber 24. For example, during operation of the internal combustion engine 10, the exhaust valve 36 may transition from a closed position 50 (FIGS. 2-4) in which the combustion chamber 24 and the exhaust port 46 are not disposed in fluid communication to an open position 52 (FIGS. 7-9) in which the combustion chamber 24 and the exhaust port 46 are disposed in fluid communication to thereby allow exhaust gas 48 to drain from the combustion chamber 24. Conversely, the intake valve 34 may transition from the open position 52 to the closed position 50 to thereby prevent exhaust gas 48 from exiting the combustion chamber 24. In one non-limiting embodiment, the internal combustion engine 10 includes two exhaust valves 36 per combustion chamber 24. In other non-limiting embodiments, the internal combustion engine 10 may include one exhaust valve 36 or three exhaust valves 36 per combustion chamber 24.

Figure 7:
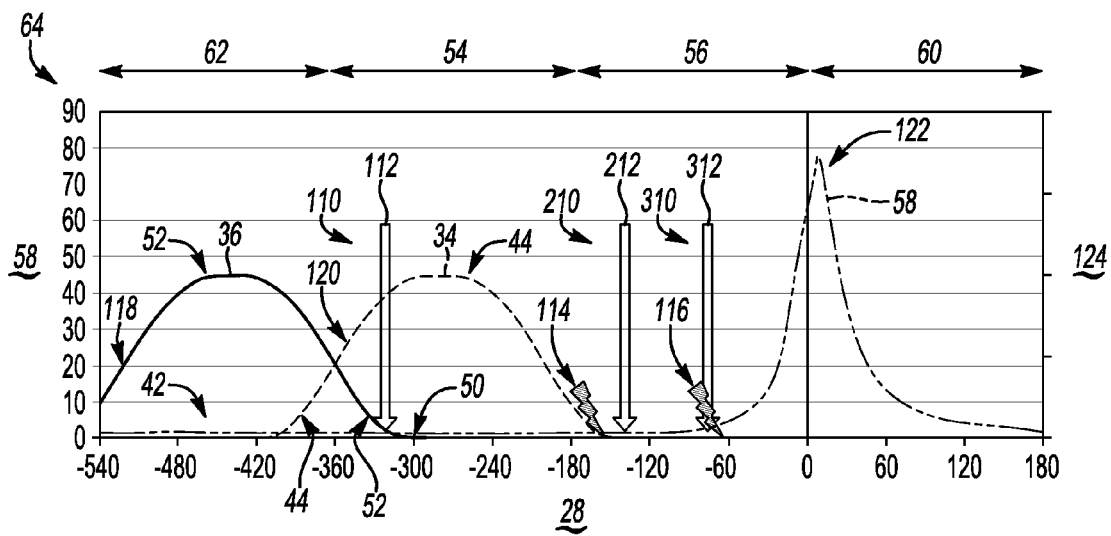
FIG. 7 is a schematic illustration of a relationship between pressure within the combustion chamber of FIGS. 2-4 as measured in kPa, valve lift within the intake port and the exhaust port of FIGS. 2-4 as measured in mm, and a rotational position of a piston disposed within the combustion chamber during a first operating condition of the internal combustion engine of FIG. 1 as measured in angular degrees.
Figure 8:
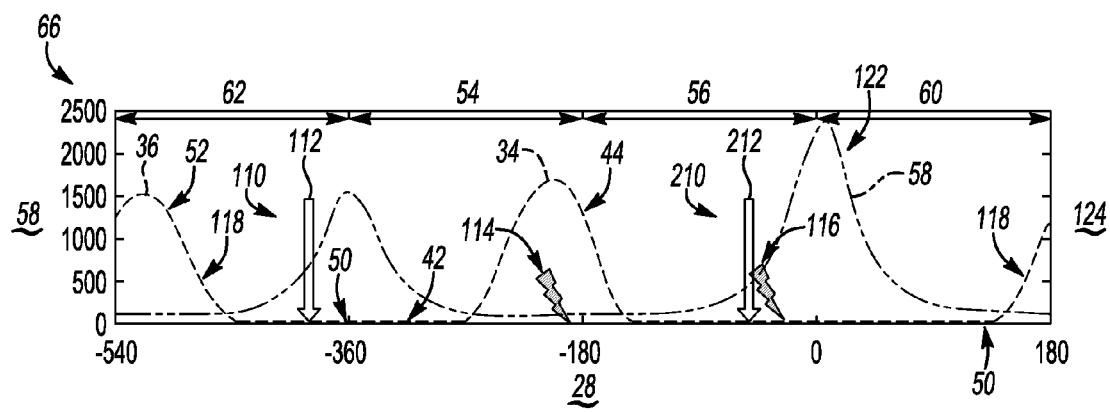
FIG. 8 is a schematic illustration of a relationship between pressure within the combustion chamber of FIGS. 2-4 as measured in kPa, valve lift within the intake port and the exhaust port of FIGS. 2-4 as measured in mm, and a rotational position of a piston disposed within the combustion chamber during a second operating condition of the internal combustion engine of FIG. 1 as measured in angular degrees.
Figure 9:
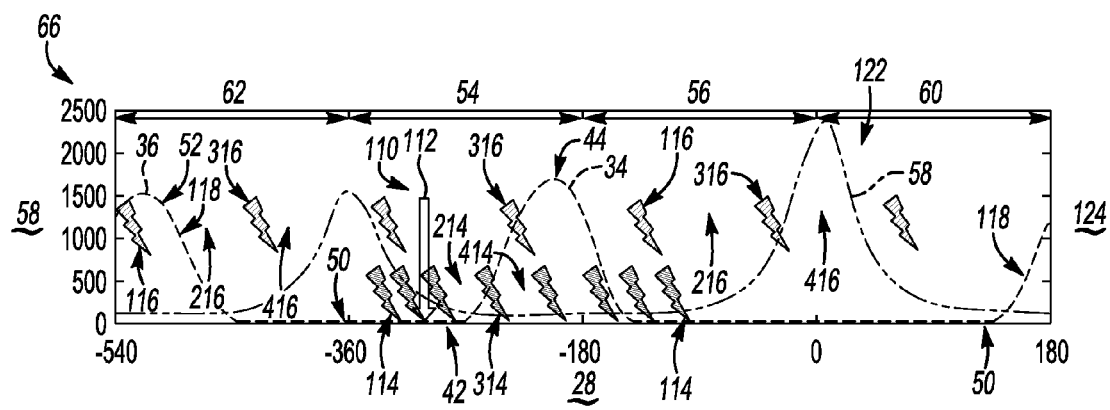
FIG. 9 is a schematic illustration of a relationship between pressure within the combustion chamber of FIGS. 2-4 as measured in kPa, valve lift within the intake port and the exhaust port of FIGS. 2-4 as measured in mm, and a rotational position of a piston disposed within the combustion chamber during a third operating condition of the internal combustion engine of FIG. 1 as measured in angular degrees.

Referring now to FIGS. 7-9, during operation of the internal combustion engine 10, the piston 22 may cycle within the cylinder bore 20 via an intake stroke 54, a compression stroke 56, an expansion stroke 60, and an exhaust stroke 62 during a combustion cycle. In particular, during the intake stroke 54, the piston 22 may travel from the first position 30 (FIG. 1) to the second position 32 (FIG. 1) within the combustion chamber 24. Therefore, if the intake valve 34 is disposed in the unseated position 44, intake air 40 may be drawn into the combustion chamber 24 as the piston head 26 travels towards the crankshaft 12.

Subsequently, during the compression stroke 56, the piston 22 may travel from the second position 32 (FIG. 1) to the first position 30 (FIG. 1) within the combustion chamber 24. Therefore, if the intake valve 34 is disposed in the seated position 42 and the exhaust valve 36 is disposed in the closed position 50, the piston 22 may compress the intake air 40 and increase a pressure 58 (FIGS. 7-9) within the combustion chamber 24.

Next, during the expansion stroke 60, the piston 22 may travel from the first position 30 (FIG. 1) to the second position 32 (FIG. 1) within the combustion chamber 24. For example, as the fuel 14 is combusted after the compression stroke 56, the resulting pressure 58 (FIGS. 7-9) from combustion may push against the piston head 26 and the piston 22 may travel to the second position 32.

Finally, during the exhaust stroke 62, the piston 22 may travel from the second position 32 (FIG. 1) to the first position 30 (FIG. 1) within the combustion chamber 24. Therefore, if the intake valve 34 is disposed in the seated position 42 and the exhaust valve 36 is disposed in the open position 52, the exhaust gas 48 may be removed from the combustion chamber 24 via the exhaust port 46.

The internal combustion engine 10 may also operate under several valve protocols 64, 66 (FIGS. 7-9). For example, referring to FIG. 7, the internal combustion engine 10 may operate under a positive valve overlap (PVO) valve protocol 64 in which both the intake valve 34 and the exhaust valve 36 are concurrently disposed in the unseated position 44 and the open position 52, respectively, for one or more rotational positions 28 of the crankshaft 12. That is, the intake valve 34 may be disposed in the unseated position 44, i.e., may have a positive valve lift 124, while the exhaust valve 36 is also disposed in the open position 52 for a specified rotational position 28 of the crankshaft 12, as set forth in more detail below. An overall duration of the PVO valve protocol 64 may vary. That is, the internal combustion engine 10 may operate under the PVO valve protocol 64 during a portion of the combustion cycle.

Conversely, in another example described with reference to FIGS. 8 and 9, the internal combustion engine 10 may operate under a negative valve overlap (NVO) valve protocol 66 in which the intake valve 34 is never disposed in the unseated position 44 while the exhaust valve 36 is disposed in the open position 52 for any rotational position 28 of the crankshaft 12. Rather, during the NVO valve protocol 66, the intake valve 34 is always disposed in the seated position 42, i.e., has zero valve lift 124, while the exhaust valve 36 is disposed in the open position 52, and the exhaust valve 36 is always disposed in the closed position 50 while the intake valve 34 is disposed in the unseated position 44, as also set forth in more detail below. An overall duration of the NVO valve protocol 66 may also vary. That is, the internal combustion engine 10 may operate under the NVO valve protocol 66 during only a portion of the combustion cycle.

The internal combustion engine 10 may also operate under several combustion conditions. For example, the internal combustion engine 10 may operate under a stoichiometric combustion condition in which air 40 and the fuel 14 are combined in a stoichiometric ratio within the combustion chamber 24. Alternatively, the internal combustion engine 10 may operate under a lean combustion condition in which air 40 and the fuel 14 are not combined in a stochiometric ratio within the combustion chamber 24. Lean combustion conditions include conditions in which the fuel 14 is diluted with air 40 and/or exhaust gas 48 within the combustion chamber 24 and may be characterized as lean-stratified combustion, homogeneous charge compression ignition (HCCI) combustion, spark-assisted compression ignition, or lean homogeneous combustion. In one embodiment, the internal combustion engine 10 may operate as a downsize boosted dilute combustion engine in which the internal combustion engine 10 includes a reduced number of cylinder bores 20 and combustion chambers 24 and includes a boosting device such as a turbocharger or supercharger.

Referring again to FIGS. 2-4, the internal combustion engine 10 also includes a fuel nozzle 68 configured for injecting the fuel 14 (shown schematically as a cone as one non-limiting example) into the combustion chamber 24. The fuel 14 may be any composition such as, but not limited to, gasoline, ethanol, diesel, natural gas, and combinations thereof. The fuel nozzle 68 may have an end valve 70 configured for ejecting the fuel 14 and may extend through the cylinder head 18 into the combustion chamber 24. The end valve 70 may define a plurality of holes (not shown) through which the fuel 14 may be ejected. A portion of the fuel 14 ejected through one of the plurality of holes may be referenced as a fuel plume 72. Therefore, the fuel 14 injected into the combustion chamber 24 by the fuel nozzle 68 may include one or more fuel plumes 72. Generally, the fuel nozzle 68 may be arranged to deliver the fuel 14 to the combustion chamber 24 in a shape and quantity according to desired combustion characteristics and power requirements of the internal combustion engine 10. By way of non-limiting examples, the fuel 22 may have a generally conical shape, a generally triangular shape, a generally cylindrical shape, a generally oblong shape, a generally oval shape, or a generally amorphous or irregular shape.

For example, as described with reference to FIG. 2, the fuel 14 may have a first boundary 78 and a second boundary 80 defining a spray angle 82 therebetween. In one specific non-limiting example, the fuel 14 may have a generally conical shape and may include a base plane 74, e.g., a generally circular base plane, a central longitudinal axis 76 extending from and disposed perpendicular to the base plane 74, the first boundary 78 intersecting the base plane 74, and the second boundary 80 intersecting the base plane 74. Therefore, the first boundary 78 and the second boundary 80 may define the spray angle 82 therebetween and may intersect at a vertex 84 spaced apart from the base plane 74 along the central longitudinal axis 76. That is, the vertex 84 may be aligned with the end valve 70 of the fuel nozzle 68.

With continued reference to FIGS. 2-4, the internal combustion engine 10 also includes a first plasma igniter 86 configured for generating a first plurality of free radicals 88 within the intake port 38. The first plasma igniter 86 may be selected according to desired combustion characteristics within the combustion chamber 24.

By way of non-limiting example, the first plasma igniter 86 may be a dielectric-barrier-discharge plasma igniter 400 (shown generally in FIGS. 2 and 3). The dielectric-barrier-discharge plasma igniter 400 may include one or more dielectric or insulating barriers (not shown) formed from, for example, alumina, and defining a gap (not shown), and may eject an electrical current through the gap into the intake port 38 to thereby generate the first plurality of free radicals 88. The first plurality of free radicals 88 may prime the intake air 40 disposed within the intake port 38 to increase combustability of the intake air 40 during combustion within the combustion chamber 24. That is, the first plurality of free radicals 88 may be generated by the first plasma igniter 86 to prepare the intake air 40 for efficient combustion.

As used herein, the terminology "dielectric-barrier-discharge plasma igniter" is contrasted with the terminology "spark plug" (shown generally at 200 in FIG. 2). A spark plug 200 is configured for ejecting an electrical current characterized by a peak current of less than or equal to about 200 milliamps. In contrast, for embodiments in which the first plasma igniter 86 is the dielectric-barrier-discharge plasma igniter 400, the first plasma igniter 86 is configured for ejecting the electrical current characterized by a peak current that exceeds about 20 amperes. When configured as the dielectric-barrier-discharge plasma igniter 400, the first plasma igniter 86 may be characterized as a single dielectric barrier plasma igniter, such that the first plasma igniter 86 includes one dielectric or insulating barrier (not shown). Alternatively, the first plasma igniter 86 may be characterized as a double dielectric barrier plasma igniter, such that the first plasma igniter 86 includes two dielectric or insulating barriers (not shown).

For embodiments in which the first plasma igniter 86 is configured as the dielectric-barrier-discharge plasma igniter 400 (FIG. 2), the first plasma igniter 86 may be a two-piece assembly and may include a body 92 and a firing tip 94 operatively connected to the body 92. Although shown generally, the firing tip 94 may include from two to six individual electrodes 96, e.g., four individual electrodes 96, each spaced apart from one another and arranged in a star configuration (not shown). When fired, the first plasma igniter 86 may emit an electrical field of from about 10 kV to about 75 kV from the firing tip 94 into the intake port 38. Therefore, without intending to be limited by theory, within several nanoseconds, the electrical field may excite the intake air 40 and generate the first plurality of free radicals 88 within the intake port 38.

Alternatively, the first plasma igniter 86 may be a corona discharge plasma igniter 300 (shown generally in FIG. 4) configured for ejecting a plasma 90 (FIG. 5) having a plurality of streamers 104 (FIG. 5) into the intake port 38 to thereby generate the first plurality of free radicals 88 within the intake port 38. As used herein, the terminology "corona discharge plasma igniter" is contrasted with the terminology "spark plug" and "dielectric-barrier-discharge plasma igniter". The corona discharge plasma igniter 300 is configured for ejecting the plasma 90 as a corona including the plurality of streamers 104 and may be characterized by a peak current that exceeds about 20 amperes. Further, although not shown, the first plasma igniter 86 may include a high-voltage transformer having a primary side and a secondary side. As a non-limiting example, at about 5 ms after firing, the primary side of the first plasma igniter 86 may have a voltage of from about 45 V to about 55 V, an electrical current of from about 1 A to about 2.5 A, and a power of from about 90 W to about 110 W. As a non-limiting example, the secondary side of the first plasma igniter 86 may have a voltage of from about 30 kV to about 60 kV, and an electrical current of from about 20 mA to about 200 mA.

Referring to FIG. 4, the corona discharge plasma igniter 300 may be a two-piece assembly and may include an inductor 302 and a terminus 304 operatively connected to the inductor 302. Although shown only generally in FIG. 4, the terminus 304 may include from two to six individual electrodes 96, e.g., four individual electrodes 96, each spaced apart from one another and arranged in a star configuration (as shown generally in FIG. 5). When fired, the corona discharge plasma igniter 300 may emit an electrical field of from about 10 kV to about 75 kV from the terminus 304 into the intake port 38. Without intending to be limited by theory, within several nanoseconds, the electrical field may excite the intake air 40 within the intake port 38 near the terminus 304 and the individual electrodes 96 until the electrical field transitions to the plasma 90, which includes a plurality of charged ions.

Figure 5:
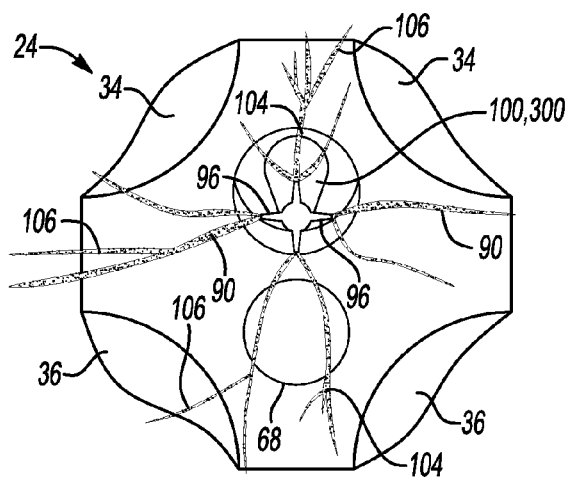
FIG. 5 is a schematic illustration of the second igniter of FIG. 3 and a plasma ejected therefrom as viewed from position V within the combustion chamber.

As described with reference to FIG. 5, as a density of the plurality of charged ions reaches a threshold, the plasma 90 may include the plurality of streamers 104 each extending from the terminus 304 (FIG. 4) and the plurality of electrodes 96. Each of the plurality of streamers 104 may be spaced apart from one another yet joined at a common center. Each streamer 104 may also include one or more branches 106 emanating from the streamer 104. That is, as used herein, the terminology "streamer" refers to a portion of the plasma 90 having an elongated, flowing, ribbon-like appearance or characteristic. In other words, the plurality of streamers 104 may refer to a plurality of rays emanating or spreading out from a center of the plasma 90, and each streamer 104 may include one or more branches 106 which then further project or fork from the streamer 104. Each streamer 104 and/or branch 106 may be configured for exciting the intake air 40 within the intake port 38 to thereby generate the first plurality of free radicals 88.

Referring again to FIGS. 2-4, the first plasma igniter 86 extends through the cylinder head 18 and protrudes into the intake port 38. For example, the firing tip 94 (FIG. 2) or terminus 304 (FIG. 4) may extend into the intake port 38 at a desired protrusion or depth. In one non-limiting example, the firing tip 94 or terminus 304 may extend into the intake port 38 and be spaced apart from the cylinder head 18 by a distance 98 (FIG. 2) of from about 1 mm to about 15 mm, e.g., about 3 mm or about 5 mm or about 7 mm or about 9 mm or about 11 mm or about 13 mm. The distance 98 may be selected according to desired characteristics within the intake port 38, such as temperature and/or desired duration of combustion within the combustion chamber 24.

As described with continued reference to FIGS. 2-4, the internal combustion engine 10 also includes a second igniter 100 configured for initiating a flame 102 within the combustion chamber 24 to thereby ignite the fuel 14. The second igniter 100 may also be configured for generating a second plurality of free radicals 188. The second igniter 100 extends through the cylinder head 18 and protrudes into the combustion chamber 24. In contrast with the first plasma igniter 86 described above which may not initiate the flame 102 within the intake port 38 but may rather generate the first plurality of free radicals 88 within the intake port 38, the second igniter 100 may commence the flame 102 within the combustion chamber 24 to thereby set off combustion and consumption of the fuel 14.

In one non-limiting embodiment described with reference to FIG. 2, the second igniter 100 may be the spark plug 200, e.g., a resistor-type spark plug, a hot spark plug, or a cold spark plug. In contrast with the first plasma igniter 86 which protrudes into the intake port 38 as described above, the spark plug 200 may eject an electrical current characterized by a peak current of less than or equal to about 200 milliamps into the combustion chamber 24. For example, although the spark plug 200 may include any suitable configuration, the spark plug 200 may generally include a copper core (not shown), an insulator 202 surrounding the copper core, a center electrode 204 extending from the insulator 202 and attached to the copper core, and a ground electrode 206 spaced apart from the center electrode 204. Upon activation, the electrical current may connect the ground electrode 206 and the center electrode 204 to thereby ignite the fuel 14 within the combustion chamber 24. In addition, after activation, the spark plug 200 may dissipate a portion of the heat produced by combustion via the insulator 202.

Referring again to FIG. 2, the ground electrode 206 may extend into the combustion chamber 24 at a desired protrusion or depth. For example, the ground electrode 206 may extend into the combustion chamber 24 and be spaced apart from the cylinder head 18 by a depth 198 of from about 1 mm to about 15 mm, e.g., about 3 mm or about 5 mm or about 7 mm or about 9 mm or about 11 mm or about 13 mm. The depth 198 may be selected according to desired characteristics within the combustion chamber 24, such as temperature, duration of combustion within the combustion chamber 24, and/or fuel spray angle 82.

In another non-limiting embodiment described with reference to FIGS. 3 and 4, the second igniter 100 may be the corona discharge plasma igniter 300 configured for ejecting the plasma 90 (FIG. 5) having the plurality of streamers 104 (FIG. 5) into the combustion chamber 24 to ignite the fuel 14. The corona discharge plasma igniter 300 is configured for ejecting the plasma 90 as a corona including the plurality of streamers 104 and may be characterized by a peak current that exceeds about 20 amperes. Further, although not shown, the second igniter 100 may include a high-voltage transformer having a primary side and a secondary side. As a non-limiting example, at about 5 ms after firing, the primary side of the second igniter 100 may have a voltage of from about 45 V to about 55 V, an electrical current of from about 1 A to about 2.5 A, and a power of from about 90 W to about 110 W. As a non-limiting example, the secondary side of the second igniter 100 may have a voltage of from about 30 kV to about 60 kV, and an electrical current of from about 20 mA to about 200 mA.

The corona discharge plasma igniter 300 may be a two-piece assembly and may include the inductor 302 and the terminus 304 operatively connected to the inductor 302. When fired, the corona discharge plasma igniter 300 may emit an electrical field of from about 15 kV to about 75 kV from the terminus 304 into the combustion chamber 24. Without intending to be limited by theory, within several nanoseconds, the electrical field may excite the intake air 40 and the fuel 14 within the combustion chamber 24 near the terminus 304 and the individual electrodes 96 until the electrical field transitions to the plasma 90, which includes a plurality of charged ions.

As described with reference to FIG. 5, as a density of the plurality of charged ions reaches a threshold, the plasma 90 may include the plurality of streamers 104 each extending from the terminus 304 (FIG. 3) and the plurality of electrodes 96. Each of the plurality of streamers 104 may be spaced apart from one another yet joined at a common center, e.g., the vertex 84. Each streamer 104 may also include one or more branches 106 emanating from the streamer 104. Each streamer 104 and/or branch 106 may be configured for igniting the fuel 14 and/or generating the second plurality of free radicals 188 within the combustion chamber 24. Therefore, the plurality of streamers 104 may ignite several portions of the fuel 14 at the same time and may provide fast, homogeneous, and effective combustion of the fuel 14. Alternatively or additionally, the second igniter 100 may operate to generate the second plurality of free radicals 188 so that an entirety of the fuel 14 may ignite simultaneously.

Referring again to FIG. 3 and as set forth above, the terminus 304 may extend into the combustion chamber 24 at a desired protrusion or depth. For example, the terminus 304 may be spaced apart from the cylinder head 18 by an interval 298 of from about 1 mm to about 15 mm, e.g., about 3 mm or about 5 mm or about 7 mm or about 9 mm or about 11 mm or about 13 mm. The interval 298 may be selected according to desired combustion characteristics within the combustion chamber 24, such as temperature, duration of combustion, and/or spray angle 82. For example, generally, the terminus 304 may extend farther into the combustion chamber 24, i.e., the interval 298 may be comparatively larger, for comparatively smaller spray angles 82. In one non-limiting example, the terminus 304 may protrude into the combustion chamber 24 at the interval 298 of from about 5 mm to about 15 mm, e.g., about 7 mm, and the spray angle 82 may be from about 50° to about 70°, e.g., about 60°. In another non-limiting example, the terminus 304 may protrude into the combustion chamber 24 at the interval 298 of from about 1 mm to about 5 mm, e.g., about 3 mm, and the spray angle 82 may be from about 70° to about 120°, e.g., about 90°.

In yet a further non-limiting embodiment, although not shown, the second igniter 100 may be configured as the dielectric-barrier-discharge plasma igniter 400 having the same configuration as the first plasma igniter 86 when the first plasma igniter 86 is configured as the dielectric-barrier-discharge igniter 400. That is, the second igniter 100 may both generate a second plurality of free radicals 188 within the combustion chamber 24 and initiate the flame 102. For example, the second igniter 100 may emit a comparatively high electrical current through one or more dielectric or insulating layers (not shown) to thereby both generate the second plurality of free radicals 188 and ignite the mixture of intake air 40 and fuel 14 within the combustion chamber 24.

Referring now to FIG. 4, in another non-limiting embodiment, the internal combustion engine 10 also includes a third plasma igniter 186 configured for generating a third plurality of free radicals 288 within the exhaust port 46. The third plasma igniter 186 may have the same or a different configuration than the first plasma igniter 86 and/or the second igniter 100. That is, the first plasma igniter 86, the second igniter 100, and the third plasma igniter 186 may each have the same or different configuration. For example, the first plasma igniter 86 may be configured as the dielectric-barrier-discharge plasma igniter 400 or the corona discharge plasma igniter 300. The second igniter 100 may be configured as the spark plug 200, the dielectric-barrier-discharge plasma igniter 400, or the corona discharge plasma igniter 300. The third plasma igniter 186 may be configured as the dielectric-barrier-discharge plasma igniter 400 or the corona discharge plasma igniter 300.

In one non-limiting embodiment, the third plasma igniter 186 may be configured as the dielectric-barrier-discharge plasma igniter 400. As such, the third plasma igniter 186 may include one or more dielectric barriers (not shown) formed from, for example, alumina, and defining a gap (not shown), and may eject the plasma 90 (FIG. 5) through the gap into the exhaust port 46 to thereby generate the third plurality of free radicals 288. The third plurality of free radicals 288 may augment the exhaust gas 48 disposed within the exhaust port 46 to increase a recyclability and/or re-combustability of the exhaust gas 48. That is, the third plurality of radicals 288 may be generated by the third plasma igniter 186 to prepare the exhaust gas 48 for recirculation to the combustion chamber 24 and mixture with additional intake air 40 and fuel 14 for re-combustion.

When configured as the dielectric-barrier-discharge plasma igniter 400, the third plasma igniter 186 is configured for ejecting the plasma 90 (FIG. 5) characterized by a peak current that exceeds about 20 amperes, and the third plasma igniter 186 may be selected according to desired combustion characteristics within the combustion chamber 24. Although not shown, the third plasma igniter 186 may include a high-voltage transformer having a primary side and a secondary side. As a non-limiting example, at about 5 ms after firing, the primary side of the third plasma igniter 186 may have a voltage of from about 45 V to about 55 V, an electrical current of from about 1 A to about 2.5 A, and a power of from about 90 W to about 110 W. As a non-limiting example, the secondary side of the third plasma igniter 186 may have a voltage of from about 30 kV to about 60 kV, and an electrical current of from about 20 mA to about 200 mA.

For embodiments in which the third plasma igniter 186 is configured as the dielectric-barrier-discharge plasma igniter 400, the third plasma igniter 186 may be a two-piece assembly and may include the body 92 and the firing tip 94 operatively connected to the body 92. Although shown generally, the firing tip 94 may include from two to six individual electrodes 96, e.g., four individual electrodes 96, each spaced apart from one another and arranged in a star configuration (not shown). When fired, the third plasma igniter 186 may emit an electrical field of from about 15 kV to about 75 kV from the firing tip 94 into the exhaust port 46. Therefore, without intending to be limited by theory, within several nanoseconds, the electrical field may excite the exhaust gas 48 and generate the third plurality of free radicals 288 within the exhaust port 46

Alternatively, the third plasma igniter 186 may be may be configured as the corona discharge plasma igniter 300 and may eject the plasma 90 (FIG. 5) having the plurality of streamers 104 (FIG. 5) into the exhaust port 46 to thereby generate the third plurality of free radicals 288 within the exhaust port 46. The corona discharge plasma igniter 300 may be configured for ejecting the plasma 90 as a corona including the plurality of streamers 104 and may be characterized by a peak current that exceeds about 20 amperes.

The corona discharge plasma igniter 300 may be a two-piece assembly and may include the inductor 302 and the terminus 304 operatively connected to the inductor 302. When fired, the corona discharge plasma igniter 300 may emit an electrical field of from about 15 kV to about 75 kV from the terminus 304 into the exhaust port 46. Without intending to be limited by theory, within several nanoseconds, the electrical field may excite the exhaust gas 48 within the exhaust port 46 near the terminus 304 and the individual electrodes 96 until the electrical field transitions to the plasma 90, which includes a plurality of charged ions.

As described with reference to FIG. 5, as a density of the plurality of charged ions reaches a threshold, the plasma 90 may include the plurality of streamers 104 each extending from the terminus 304 (FIG. 4) and the plurality of electrodes 96. Each of the plurality of streamers 104 may be spaced apart from one another yet joined at a common center. Each streamer 104 may also include one or more branches 106 emanating from the streamer 104. Each streamer 104 and/or branch 106 may be configured for exciting the exhaust gas 48 within the exhaust port 46 to thereby generate the third plurality of free radicals 288.

As shown in FIG. 4, the third plasma igniter 186 extends through the cylinder head 18 and protrudes into the exhaust port 46. For example, the firing tip 94 or terminus 304 (not shown) may extend into the exhaust port 46 at a desired protrusion or depth. In one non-limiting example, the firing tip 94 or terminus 304 may extend into the exhaust port 46 and be spaced apart from the cylinder head 18 by the distance 98 of from about 1 mm to about 15 mm, e.g., about 3 mm or about 5 mm or about 7 mm or about 9 mm or about 11 mm or about 13 mm. The distance 98 may be selected according to desired characteristics within the exhaust port 46, such as temperature and/or desired recirculation of the exhaust gas 48.

Figure 6:
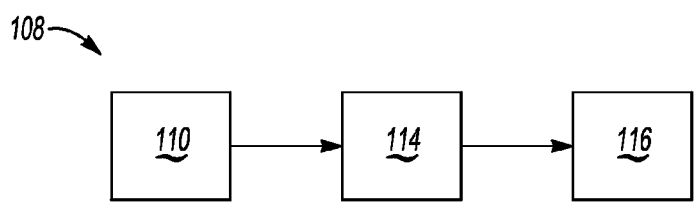
FIG. 6 is a schematic flowchart of a method of igniting a fuel within the combustion chamber of FIG. 2.

Referring now to FIG. 6, a method 108 of igniting the fuel 14 within the combustion chamber 24 is disclosed. The method 108 includes injecting 110 a first portion 112 (FIGS. 7-9) of the fuel 14 into the combustion chamber 24. That is, injecting 110 may include ejecting the first portion 112 from the fuel nozzle 68 in a desired quantity and/or at a desired rotational position 28 of the crankshaft 12. The quantity and timing of such injection may be controlled by a suitable controller (not shown) and/or computational system, e.g., an engine control unit of the vehicle.

Both the quantity of the first portion 112 and the timing of injecting 110 the first portion 112 may be selected according to the desired characteristics of a mixture of the intake air 40 and fuel 14 within the combustion chamber 24; the valve protocol 64, 66; and/or the operating condition of the internal combustion engine 10. For example, the first portion 112 may be from about 1 mg to about 20 mg of fuel 14, or from about 3 mg to about 15 mg of fuel 14, or from about 9 mg to about 13 mg of fuel 14, or about 10.5 mg of fuel 14. Further, injecting 110 may occur at any desired rotational position 28 of the crankshaft 12. As non-limiting examples described with reference to FIG. 7, the fuel nozzle 68 may inject the first portion 112 of the fuel 14 into the combustion chamber 24 when the crankshaft 12 has the rotational position 28 of from about −540° to about −180°, or from about −450° to about −90°, or at about −480° or at about −315°.

As described with reference to FIG. 7, the method 108 may also include injecting 210, 310 additional fuel 14 into the combustion chamber 24. That is, the method 108 may further include, after injecting 110 the first portion 112, injecting 210 a second portion 212 of the fuel 14 into the combustion chamber 24. Injecting 210 may include ejecting the second portion 212 from the fuel nozzle 68 after injection of the first portion 112 in a desired quantity and/or at a desired rotational position 28 of the crankshaft 12. Therefore, the first portion 112 and the second portion 212 may be injected into the combustion chamber 24 separately and may represent unique or distinct fuel-injection events. Stated differently, the method 108 may include multiple injections of fuel 14. For example, the method 108 may include from two to ten injections of fuel 14, such as three injections, four injections, five injections, six injections, or eight injections of fuel 14, as set forth in more detail below.

Both the quantity of the second portion 212 and the timing of injecting 210 the second portion 212 may be selected according to the desired characteristics of the mixture of the intake air 40 and fuel 14 within the combustion chamber 24; the valve protocol 64, 66; and/or the operating condition of the internal combustion engine 10. Further, the second portion 212 may be less than, equal to, or greater than the first portion 112. For example, the second portion 212 may be from about 1 mg to about 20 mg of fuel 14, or from about 5 mg to about 15 mg of fuel 14, or about 10.5 mg of fuel 14. Further, injecting 210 may occur at any desired rotational position 28 of the crankshaft 12. As non-limiting examples, the fuel nozzle 68 may inject the second portion 212 of the fuel 14 into the combustion chamber 24 when the crankshaft 12 has the rotational position 28 of from about −360° to about 0°, or from about −200° to about −20°, or at about −140° or at about −40°.

Similarly, referring again to FIG. 7, the method 108 may further include, after injecting 210 the second portion 212, injecting 310 a third portion 312 of the fuel 14 into the combustion chamber 24. Injecting 310 may include ejecting the third portion 312 from the fuel nozzle 68 after injection of the first portion 112 and the second portion 212 in a desired quantity and/or at a desired rotational position 28 of the crankshaft 12. Therefore, the first portion 112, the second portion 212, and the third portion 312 may be injected into the combustion chamber 24 separately and may represent unique or distinct fuel-injection events. Such second and/or third injection may also be controlled by a suitable controller (not shown) and/or computational system, e.g., the engine control unit of the vehicle.

Both the quantity of the third portion 312 and the timing of injecting 310 the third portion 312 may be selected according to the desired characteristics of a mixture of the intake air 40 and fuel 14 within the combustion chamber 24; the valve protocol 64, 66; and/or the operating condition of the internal combustion engine 10. Further, the third portion 312 may be less than, equal to, or greater than the first portion 112 and/or the second portion 212. For example, the third portion 312 may be from about 1 mg to about 20 mg of fuel 14, or from about 2 mg to about 5 mg of fuel 14, or about 3 mg of fuel 14. Further, injecting 310 may occur at any desired rotational position 28 of the crankshaft 12. As non-limiting examples, the fuel nozzle 68 may inject the third portion 312 of the fuel 14 into the combustion chamber 24 when the crankshaft 12 has the rotational position 28 of from about −120° to about −60°, or from about −100° to about −70°, or at about −80 °.

Further, although not shown in FIG. 7, the method 108 may further include, after injecting 310 the third portion 312, injecting a fourth portion of the fuel 14, or a fifth portion of the fuel 14, or a sixth portion of the fuel 14, or an eighth portion of the fuel 14 into the combustion chamber 24. Such injecting may include ejecting the fourth portion or the fifth portion or the sixth portion or the eighth portion from the fuel nozzle 68 after injection of the first portion 112, the second portion 212, and the third portion 312 in a desired quantity and/or at a desired rotational position 28 of the crankshaft 12. Therefore, the first portion 112, the second portion 212, the third portion 312, the fourth portion, fifth portion, sixth portion, and/or eighth portion may be injected into the combustion chamber 24 separately and may represent unique or distinct fuel-injection events. Such additional injection may also be controlled by a suitable controller (not shown) and/or computational system, e.g., the engine control unit of the vehicle.

Both the quantity of the additional portion(s) and the timing of injecting the additional portion(s) may be selected according to the desired characteristics of a mixture of the intake air 40 and fuel 14 within the combustion chamber 24; the valve protocol 64, 66; and/or the operating condition of the internal combustion engine 10. Further, the fourth portion, fifth portion, sixth portion, and/or eighth portion may be less than, equal to, or greater than any of the first portion 112, the second portion 212, and/or the third portion 312. For example, any additional portion(s), i.e., the third portion, the fourth portion, the fifth portion, the sixth portion, and/or the eighth portion, may be from about 1 mg to about 20 mg of fuel 14, or from about 2 mg to about 5 mg of fuel 14, or about 3 mg of fuel 14. Further, such additional injecting may occur at any desired rotational position 28 of the crankshaft 12. As non-limiting examples, the fuel nozzle 68 may inject the fourth portion, the fifth portion, the sixth portion, and/or the eighth portion of the fuel 14 into the combustion chamber 24 when the crankshaft 12 has the rotational position 28 of from about −120° to about −60°, or from about −100° to about −70°, or at about −80 °.

Referring again to FIG. 6, the method 108 also includes energizing 114 the first plasma igniter 86 within the intake port 38 to generate the first plurality of free radicals 88. Such energizing 114 may likewise be controlled by a suitable controller (not shown) and/or computational system, e.g., an engine control unit of the vehicle.

As indicated in FIGS. 7 and 8, energizing 114 may be subsequent to injecting 110 the first portion 112 of the fuel 14. For example, the first plasma igniter 86 may be energized when the crankshaft 12 has the rotational position 28 of from about −270° to about −140°, or from about −200° to about −160°, or at about −190° or at about −150°. Energizing 114 may be subsequent to injecting 110 for conditions requiring excellent mixing of the intake air 40 and fuel 14 within the combustion chamber 24.

Alternatively, as described with reference to FIG. 9, energizing 114 may be prior to injecting 110 the first portion 112 of the fuel 14. For example, the first plasma igniter 86 may be energized when the crankshaft 12 has the rotational position 28 of from about −540° to about −300°, or from about −450° to about −340°. Energizing 114 may be prior to injecting 110 for conditions requiring excellent saturation of the intake air 40 by the first plurality of free radicals 88.

As another alternative, energizing 114 may be substantially concurrent to injecting 110 the first portion 112 of the fuel 14. For example, the first plasma igniter 86 may be energized and the first portion 112 of the fuel 14 may be injected when the crankshaft 12 has the rotational position 28 of from about −360° to about −270°, or from about −320° to about −310°. Energizing 114 the first plasma igniter 86 substantially concurrent to injecting 110 the first portion 112 may be especially suitable for conditions requiring a shortened duration of mixing between the primed intake air 40 including the first plurality of free radicals 88 and the fuel 14 within the combustion chamber 24.

Referring again to FIG. 6, the method 108 also includes, after injecting 110 the first portion 112, activating 116 the second igniter 100 within the combustion chamber 24 to thereby ignite the fuel 14. Activating 116 the second igniter 100, which may be, for example, the spark plug 200, the corona discharge plasma igniter 300, or the dielectric-barrier-discharge plasma igniter 400 as set forth above, may initiate the flame 102 within the combustion chamber 24 and thereby ignite the fuel 14. Therefore, the method 108 may include multiple plasma ignition events, and such plasma ignition events, i.e., energizing 114 and activating 116, may be controlled by a suitable controller (not shown) and/or computational system, e.g., an engine control unit of the vehicle.

More specifically, as indicated in FIGS. 7-9, activating 116 may be subsequent to energizing 114 the first plasma igniter 86. For example, the second igniter 100 may be activated when the crankshaft 12 has the rotational position 28 of from about −360° to about 0°, or from about −120° to about 0°, or from about −90° to about −30°. Activating 116 may be subsequent to energizing 114 for operating conditions requiring flame propagation through the mixture including intake air 40 that is primed with the first plurality of free radicals 88.

Further, for embodiments including the second portion 212 of the fuel 14, as indicated in FIG. 7, the method 108 (FIG. 6) may include, after injecting 210 the second portion 212 of the fuel 14, activating 116 the second igniter 100. For example, the second portion 212 may be injected when the crankshaft 12 has the rotational position 28 of from about −180° to about −120°, and the second igniter 100 may be activated when the crankshaft 12 has the rotational position 28 of from about −120° to about 0°, or from about −90° to about −60°, or at about −65°.

Similarly, for embodiments including the third portion 312 of the fuel 14, the method 108 may include, after injecting 310 the third portion 312, activating 116 the second igniter 100 as also indicated in FIG. 7. For example, the third portion 312 may be injected when the crankshaft 12 has the rotational position 28 of from about −120° to about −70°, and the second igniter 100 may be activated when the crankshaft 12 has the rotational position 28 of from about −90° to about −60°.

Alternatively, as described with reference to FIG. 9, activating 116 may be prior to energizing 114 the first plasma igniter 86. For example, the second igniter 100 may be activated when the crankshaft 12 has the rotational position 28 of from about −360° to about −90°, or from about −350° to about −100°, or from about −270° to about −90°. Activating 116 may be prior to energizing 114 during segments of the NVO valve protocol 66 when the NVO valve protocol 66 includes multiple plasma ignition events or schedules. However, although not described with reference to FIG. 9, such activating 116 and energizing 114 may also be applicable to the PVO valve protocol 64.

As another alternative as also shown in FIG. 9, activating 116 may be substantially concurrent to energizing 114 the first plasma igniter 86. For example, the second igniter 100 may be activated and the first plasma igniter 86 may be energized when the crankshaft 12 has the rotational position 28 of from about −360° to about −90°, or from about −350° to about −120°, or from about −250° to about −150°. Activating 116 the second igniter 100 substantially concurrent to energizing 114 the first plasma igniter 86 may be especially suitable for conditions requiring a shortened duration of mixing between the primed intake air 40 including the first plurality of free radicals 88 and the fuel 14 within the combustion chamber 24.

With continued reference to FIG. 9, the method 108 may also include, after energizing 114 the first plasma igniter 86, de-energizing 214 the first plasma igniter 86 and subsequently re-energizing 314 the first plasma igniter 86. That is, the first plasma igniter 86 may be cycled between an energized state, a de-energized state, and a re-energized state as the crankshaft 12 cycles between rotational positions 28. Such cycling may be especially suitable for operating conditions or valve protocols 64, 66 requiring multiple plasma ignition events. Therefore, the method 108 allows for precise control of a specific quantity, timing, and/or duration of the first plurality of free radicals 88 within the intake port 38.

Likewise, with continued reference to FIG. 9, the method 108 may further include, after activating 116 the second igniter 100, de-activating 216 the second igniter 100 and subsequently re-activating 316 the second igniter 100. That is, the second igniter 100 may also be cycled between an activated state, a de-activated state, and a re-activated state as the crankshaft 12 cycles between rotational positions 28. As such, the method 108 also allows for precise control of a specific quality, timing, and/or duration of flame initiation and/or generation of the second plurality of free radicals 188 within the combustion chamber 24.

Therefore, the second igniter 100 may be activated while or independent of energizing 114 the first plasma igniter 86. That is, the method 108 may include, after subsequently re-energizing 314 the first plasma igniter 86, again de-energizing 414 the first plasma igniter 86. After again de-energizing 414 the first plasma igniter 86, the method 108 may include activating 116 the second igniter 100, then de-activating 216 the second igniter 100, and subsequently re-activating 316 the second igniter 100. In addition, the method 108 may include, after subsequently re-activating 316 the second igniter 100, again de-activating 416 the second igniter 100. Therefore, the method 108 also allows for precise control and customization of a specific quality, timing, and/or duration of flame initiation within the combustion chamber 24 in relation to the quantity, timing, and/or duration of the first plurality of free radicals 88 within the intake port 38 or the second plurality of free radicals 188 within the combustion chamber 24.

As described with continued reference to FIG. 9, after again de-activating 416 the second igniter 100, the method 108 may include energizing 114 the first plasma igniter 86, then de-energizing 214 the first plasma igniter 86, and subsequently re-energizing 314 the first plasma igniter 86. Alternatively, the method 108 may include after de-activating 216 the second igniter 100, de-energizing 214 the first plasma igniter 86, and subsequently re-activating 316 the second igniter 100.

Therefore, the method 108 allows for multiple ignition events, i.e., energizing 114, de-energizing 214, re-energizing 314, activating 116, de-activating 216, and/or re-activating 316, per igniter 86, 100, 186. Additionally, the method 108 allows for multiple fuel-injection events, i.e., injecting 110 the first portion 112, injecting 210 the second portion 212, and/or injecting 310 the third portion 312 to optimize combustion of the fuel 14 within the combustion chamber 24 and thereby optimize operation and performance of the internal combustion engine 10.

Accordingly, the method 108 may be suitable for both the positive valve overlap (PVO) valve protocol 64 (FIG. 7) and the negative valve overlap (NVO) valve protocol 66 (FIGS. 8 and 9) for operating the internal combustion engine 10. In particular, as described with reference to FIGS. 7-9, for each of the PVO valve protocol 64 and the NVO valve protocol 66, the method 108 includes, during the intake stroke 54 of the piston 22, injecting 110 the first portion 112 of the fuel 14 into the combustion chamber 24, and translating 120 (FIG. 7) the intake valve 34 from the seated position 42 to the unseated position 44. Further, the method 108 includes, during the compression stroke 56 of the piston 22 and after translating 120 the intake valve 34, again translating 120 the intake valve 34 from the unseated position 44 to the seated position 42.

However, referring now to FIG. 7 and the PVO valve protocol 64, the method 108 may include, during the compression stroke 56, energizing 114 the first plasma igniter 86. That is, the method 108 may include generating the first plurality of free radicals 88 within the intake port 38 during the compression stroke 56 to thereby prime the intake air 40 for combustion and mixing with the fuel 14. After energizing 114, the method 108 may include injecting 210 the second portion 212 of the fuel 14 into the combustion chamber 24, and after injecting 210 the second portion 212, activating 116 the second igniter 100 to thereby initiate the flame 102 within the combustion chamber 24 and ignite the fuel 14.

Likewise, for embodiments including the third portion 312 of the fuel 14, the method 108 may further include, during the compression stroke 56, after injecting 210 the second portion 212 and before activating 116 the second igniter 100, injecting 310 the third portion 312 of the fuel 14. In addition, after injecting 310 the third portion 312, the method 108 may include activating 116 the second igniter 100.

Therefore, during the expansion stroke 60 of the piston 22 and after activating 116 the second igniter 100, the method 108 may include combusting 122 the fuel 14 to produce the exhaust gas 48. Next, during the exhaust stroke 62 of the piston 22 and after combusting 122 the fuel 14, the method 108 may include transitioning 118 the exhaust valve 36 from the closed position 50 to the open position 52 to thereby drain the exhaust gas 48 from the combustion chamber 24 through the exhaust port 46.

In addition, during the exhaust stroke 62 and after combusting 122 the fuel 14, the method 108 may include translating 120 the intake valve 34 from the seated position 42 to the unseated position 44 to thereby draw intake air 40 through the intake port 38 into the combustion chamber 24 such that the exhaust valve 36 is disposed in the open position 52 while the intake valve 34 is disposed in the unseated position 44. That is, for the PVO valve protocol 64, the intake valve 34 is disposed in the unseated position 44 and the exhaust valve 36 is disposed in the open position 52 concurrently for at least some of the rotational positions 28 of the crankshaft 12.

For embodiments including the third plasma igniter 186, although not shown, the method 108 may also include energizing 114 the third plasma igniter 186 during the exhaust stroke 62. That is, the third plurality of free radicals 288 generated by the third plasma igniter 186 within the exhaust port 46 may prime the exhaust gas 48 for any desired recirculation to the combustion chamber 24.

Referring now to FIG. 8, for the NVO valve protocol 66, the method 108 may include, during the intake stroke 54, energizing 114 the first plasma igniter 86. That is, the method 108 may include generating the first plurality of free radicals 88 within the intake port 38 during the intake stroke 54. Then, during the compression stroke 56, the method 108 may include injecting 210 the second portion 212 of the fuel 14 into the combustion chamber 24, and after injecting 210 the second portion 212, activating the second igniter 100 to thereby ignite the fuel 14 within the combustion chamber 24. That is, the method 108 may include initiating the flame 102 within the combustion chamber 24 by activating 116 the second igniter 100.

During the expansion stroke 60 of the piston 22 and after activating 116 the second igniter 100, the method 108 may include combusting 122 the fuel 14 to produce the exhaust gas 48, and transitioning 118 the exhaust valve 36 from the closed position 50 to the open position 52 to thereby drain the exhaust gas 48 from the combustion chamber 24 through the exhaust port 46.

During the exhaust stroke 62, the method 108 may include transitioning 118 the exhaust valve 36 from the open position 52 to the closed position 50 such that the exhaust valve 36 is disposed in the closed position 50 while the intake valve 34 is disposed in the seated position 42. That is, for the NVO valve protocol 66, the exhaust valve 36 is disposed in the closed position 50 and the intake valve 34 is disposed in the seated position 42 concurrently.

For embodiments including the third plasma igniter 186, although not shown, the method 108 may also include energizing 114 the third plasma igniter 186 during the exhaust stroke 62. That is, the third plurality of free radicals 288 generated by the third plasma igniter 186 within the exhaust port 46 may prime the exhaust gas 48 for any desired recirculation to the combustion chamber 24.

Therefore, the method 108 and internal combustion engine 10 enable efficient and effective combustion within the combustion chamber 24 during operation of the internal combustion engine 10. In particular, the first plurality of free radicals 88 generated by the first plasma igniter 86 protruding into the intake port 38, and the flame 102 initiated by the second igniter 100, e.g., the corona discharge plasma igniter 300, the spark plug 200, or the dielectric-barrier-discharge plasma igniter 400 protruding into the combustion chamber 24, enable robust combustion, particularly during lean low-temperature operating conditions of the internal combustion engine 10. Such robust combustion in turn provides for excellent fuel economy and minimized emissions from the internal combustion engine 10 during operation, even for embodiments which do not include the second igniter 100 configured as the spark plug 200.

As such, the internal combustion engine 10 may be especially suitable for operating during a lean combustion condition, i.e., when the fuel 14 is diluted by air 40 and/or exhaust gas 48, and may be substantially free from misfire and unstable combustion. Further, the first plasma igniter 86 in combination with the second igniter 100 minimize emissions of nitrogen oxide, nitrogen dioxide, and nitric oxide from the internal combustion engine 10. Further, the method 108 is efficient and effective for both the PVO and NVO valve protocols 64, 66. Therefore, the internal combustion engine 10 exhibits excellent combustion stability and fuel efficiency and reduced emissions as compared to engines (not shown) which do not include the first plasma igniter 86 protruding into the intake port 38 and the second igniter 100 protruding into the combustion chamber 24.

As such, the internal combustion engine 10 may include a reduced number of cylinder bores 20 and combustion chambers 34 as compared to other engines (not shown) and yet may still produce a required power for a given vehicle operating condition. Stated differently, the internal combustion engine 10 may provide sufficient power and similar performance of a larger engine, yet may be comparatively more efficient and produce relatively less emissions than the larger engine. Therefore, a vehicle including the internal combustion engine 10 may be comparatively lightweight and fuel efficient.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of igniting a fuel within a combustion chamber defined by a cylinder block of an internal combustion engine, the method comprising:
    injecting a first portion of the fuel through a fuel nozzle into the combustion chamber;
    energizing a first plasma igniter configured for generating a first plurality of free radicals, wherein the first plasma igniter extends through a cylinder head mated to the cylinder block and protrudes into an intake port defined by the cylinder head, wherein the intake port is able to be disposed in fluid communication with the combustion chamber, and wherein the cylinder head further defines an exhaust port disposable in fluid communication with the combustion chamber;
    after injecting the first portion, activating a second igniter configured for initiating a flame within the combustion chamber to thereby ignite the fuel, wherein the second igniter extends through the cylinder head and protrudes into the combustion chamber; and
    energizing a third plasma igniter configured for generating a third plurality of free radicals within the exhaust port, wherein the third plasma igniter extends through the cylinder head and protrudes into the exhaust port.

2. The method of claim 1, further including, after injecting the first portion, injecting a second portion of the fuel into the combustion chamber, and after injecting the second portion, activating the second igniter.

3. The method of claim 2, further including, after injecting the second portion, injecting a third portion of the fuel into the combustion chamber, and after injecting the third portion, activating the second igniter.

4. The method of claim 1, wherein energizing the first plasma igniter is subsequent to injecting the first portion of the fuel.

5. The method of claim 1, wherein energizing the first plasma igniter is prior to injecting the first portion of the fuel.

6. The method of claim 1, wherein energizing the first plasma igniter is substantially concurrent to injecting the first portion of the fuel.

7. The method of claim 1, wherein activating the second igniter is subsequent to energizing the first plasma igniter.

8. The method of claim 1, wherein activating the second igniter is prior to energizing the first plasma igniter.

9. The method of claim 1, wherein activating the second igniter is substantially concurrent to energizing the first plasma igniter.

10. The method of claim 1, further including, after energizing the first plasma igniter, de-energizing the first plasma igniter and subsequently re-energizing the first plasma igniter.

11. The method of claim 10, further including:
    after subsequently re-energizing the first plasma igniter, again de-energizing the first plasma igniter; and
    after again de-energizing the first plasma igniter, activating the second igniter, then de-activating the second igniter, and subsequently re-activating the second igniter.

12. The method of claim 1, further including, after activating the second igniter, de-activating the second igniter and subsequently re-activating the second igniter.

13. The method of claim 12, further including:
    after subsequently re-activating the second igniter, again de-activating the second igniter; and
    after again de-activating the second igniter, energizing the first plasma igniter, then de-energizing the first plasma igniter, and subsequently re-energizing the first plasma igniter.

14. The method of claim 1, further including:
    after activating the second igniter, de-activating the second igniter; and
    after de-activating the second igniter, de-energizing the first plasma igniter and subsequently re-activating the second igniter.

15. The method of claim 1, further including:
    during an intake stroke of a piston disposed within the combustion chamber in which the piston travels from a first position to a second position within the combustion chamber:
        injecting the first portion of the fuel into the combustion chamber; and
        translating an intake valve from a seated position in which the intake port and the combustion chamber are not disposed in fluid communication to an unseated position in which the intake port and the combustion chamber are disposed in fluid communication to thereby draw air from the intake port into the combustion chamber; and
    during a compression stroke of the piston in which the piston travels from the second position to the first position within the combustion chamber and thereby compresses the air, and after translating the intake valve:
        again translating the intake valve from the unseated position to the seated position.

16. The method of claim 15, further including:
    during the compression stroke:
        energizing the first plasma igniter;
        after energizing the first plasma igniter, injecting a second portion of the fuel into the combustion chamber; and
        after injecting the second portion, activating the second igniter to thereby ignite the fuel;
    during an expansion stroke of the piston in which the piston travels from the first position to the second position within the combustion chamber, and after activating the second igniter, combusting the fuel to produce an exhaust gas; and
    during an exhaust stroke of the piston in which the piston travels from the second position to the first position within the combustion chamber, and after combusting the fuel:
        transitioning an exhaust valve from a closed position in which the combustion chamber and the exhaust port are not disposed in fluid communication to an open position in which the combustion chamber and the exhaust port are disposed in fluid communication to thereby drain the exhaust gas from the combustion chamber through the exhaust port; and
        translating the intake valve from the seated position to the unseated position to thereby draw air through the intake port into the combustion chamber such that the exhaust valve is disposed in the open position while the intake valve is disposed in the unseated position.

17. The method of claim 15, further including:
    during the intake stroke, energizing the first plasma igniter;
    during the compression stroke:
        injecting a second portion of the fuel into the combustion chamber; and
        after injecting the second portion, activating the second igniter to thereby ignite the fuel within the combustion chamber;

during an expansion stroke of the piston in which the piston travels from the first position to the second position within the combustion chamber, and after activating the second igniter:
  combusting the fuel to produce an exhaust gas; and
  transitioning an exhaust valve from a closed position in which the combustion chamber and the exhaust port are not disposed in fluid communication to an open position in which the combustion chamber and the exhaust port are disposed in fluid communication to thereby drain the exhaust gas from the combustion chamber through the exhaust port; and
during an exhaust stroke of the piston in which the piston travels from the second position to the first position within the combustion chamber, and after transitioning the exhaust valve to the open position:
  transitioning the exhaust valve from the open position to the closed position such that the exhaust valve is disposed in the closed position while the intake valve is disposed in the seated position.

18. An internal combustion engine comprising:
a cylinder block defining a combustion chamber therein;
a cylinder head mated to the cylinder block such that the cylinder head covers the combustion chamber, wherein the cylinder head defines an intake port disposable in fluid communication with the combustion chamber;
wherein the cylinder head further defines an exhaust port disposable in fluid communication with the combustion chamber;
a fuel nozzle configured for injecting a fuel into the combustion chamber;
a first plasma igniter configured for generating a first plurality of free radicals within the intake port, wherein the first plasma igniter extends through the cylinder head and protrudes into the intake port;
a second igniter configured for initiating a flame within the combustion chamber to thereby ignite the fuel, wherein the second igniter extends through the cylinder head and protrudes into the combustion chamber; and
a third plasma igniter configured for generating a third plurality of free radicals within the exhaust port, wherein the third plasma igniter extends through the cylinder head and protrudes into the exhaust port.

19. The internal combustion engine of claim 18, wherein the second igniter is a corona discharge plasma igniter configured for discharging a plasma having a plurality of streamers into the combustion chamber.

* * * * *